June 12, 1962

C. E. READ 3,038,545

IMPLEMENT LIFT DRAFT CONTROL

Filed March 6, 1959

INVENTOR.
Charles E. Read.
BY
Harness, Dickey & Pierce.
ATTORNEYS.

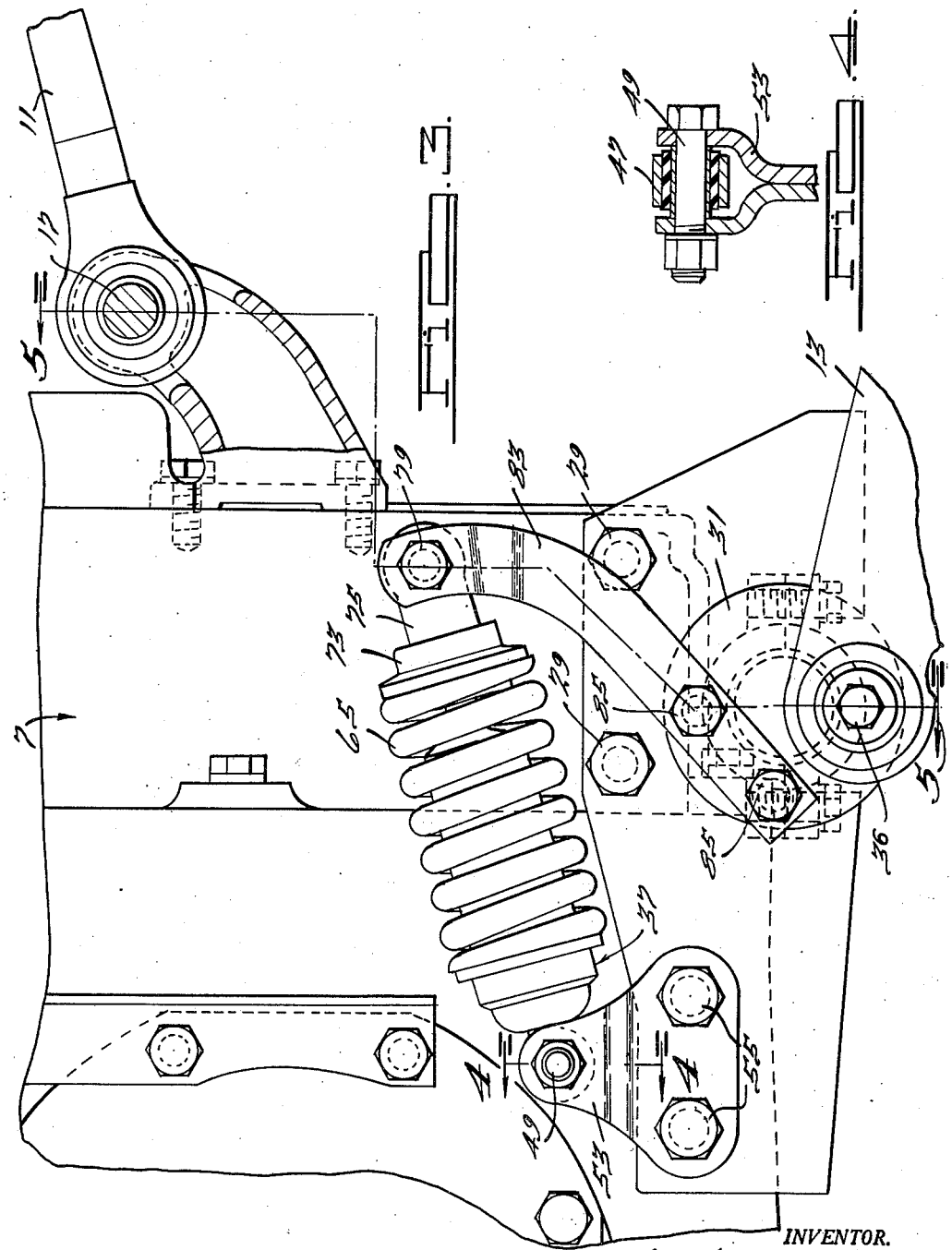

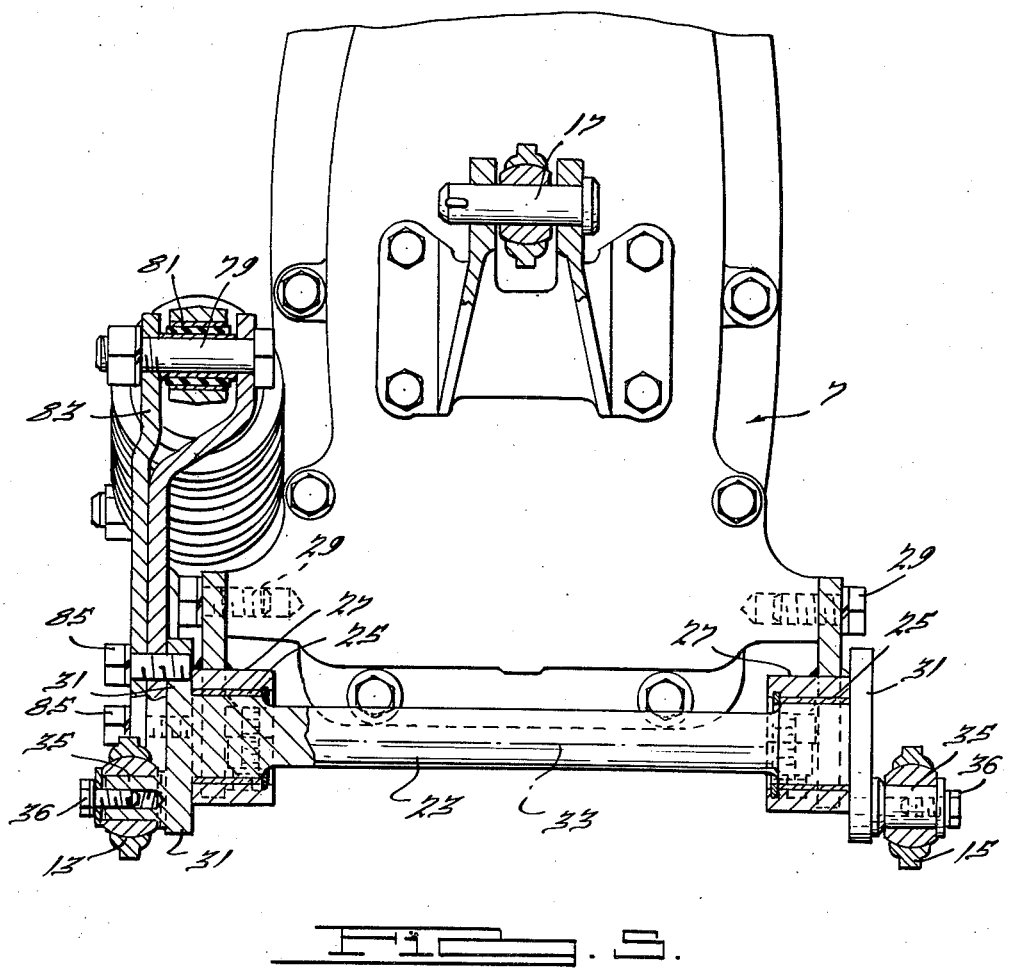

United States Patent Office
3,038,545
Patented June 12, 1962

3,038,545
IMPLEMENT LIFT DRAFT CONTROL
Charles E. Read, Monroe, Mich., assignor to Monroe Auto Equipment Company, Monroe, Mich., a corporation of Michigan
Filed Mar. 6, 1959, Ser. No. 797,712
4 Claims. (Cl. 172—239)

This invention relates generally to draft control devices and more particularly to an improved draft control device for use primarily, but not necessarily, in conjunction with an implement lift equipped farm tractor and a farm implement.

Most farm tractors in use today employ a "three point" type implement lift. This is an implement lift embodying an upper link and two lower links which are pivotally connected with an agricultural implement and pivotally connected with the tractor which pulls such implements. Such lifts are normally hydraulically controlled so that the links may be raised or lowered. When an agricultural device, such as a plow, is being pulled by a tractor, even though the draft angle has been set, the point of the plow may strike a "hard pan" in the ground, an imbedded object such as a tree root, or a rock. Such occurrence causes a rotational movement of the plow which imparts a sharp blow through the implement lift to the tractor which can cause damage to the implement and to the lift and which can cause the implement to move away from the desired draft angle.

It is an object of this invention to provide a draft control device which will cushion and dampen shocks caused by a previously described action of an agricultural implement and which will thereafter resiliently urge the implement back into the ground at the proper draft angle without surge or recovery shock.

It is a still further object of this invention to provide a draft control device of the aforementioned type which includes a hydraulic shock absorber and coil spring so that spring surge is dampened by the shock absorber and so that the implement will operate in a more efficient and better manner than has been heretofore possible.

It is a still further object of this invention to provide a draft control device of the aforementioned type in which the coil spring is mounted on the shock absorber and in which the preloading of the spring may be easily and quickly varied or adjusted.

It is a still further object of this invention to provide a draft control device of the aforementioned type which is relatively inexpensive to manufacture, durable in construction and efficient in operation.

These and other objects of the present invention will become apparent from the following detailed description taken in conjunction with the accompanying drawings in which:

FIG. 3 is an enlarged, fragmentary, side elevational view of a portion of the structure illustrated in FIG. 1;

FIG. 4 is an enlarged, sectional view of the structure illustrated in FIG. 3, taken along the line 4—4 thereof; and FIG. 5 is a view, partially in section and partially in elevation, of the structure illustrated in FIG. 3, taken along the line 5—5 thereof.

Figure 1:
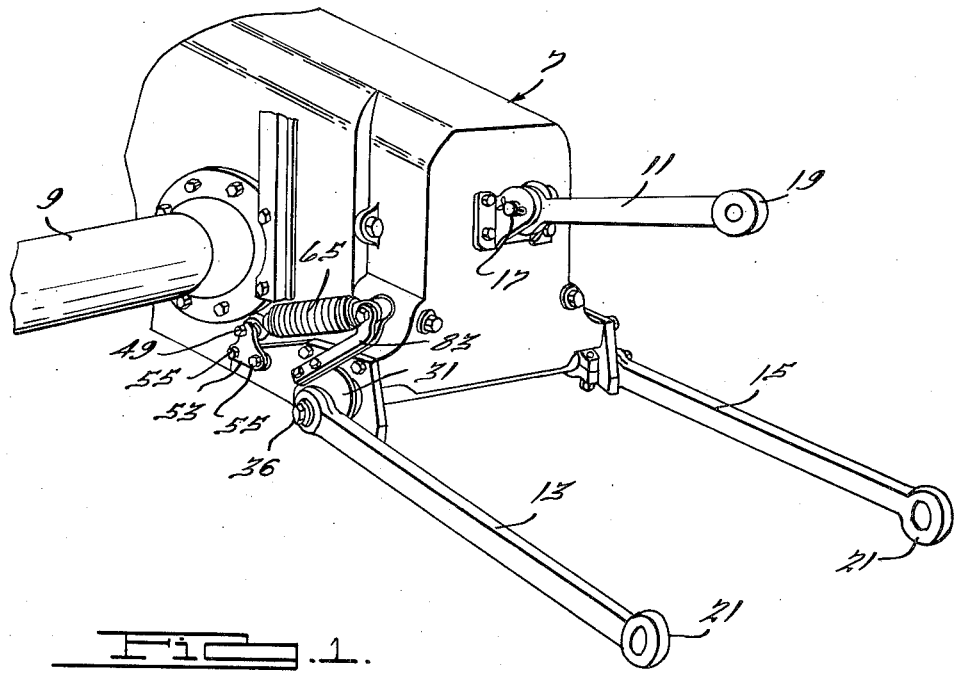
FIGURE 1 is a fragmentary, perspective view of the draft control device of this invention mounted on a portion of a vehicle, such as a farm tractor, in conjunction with a three-point type implement lift.
Figure 2:
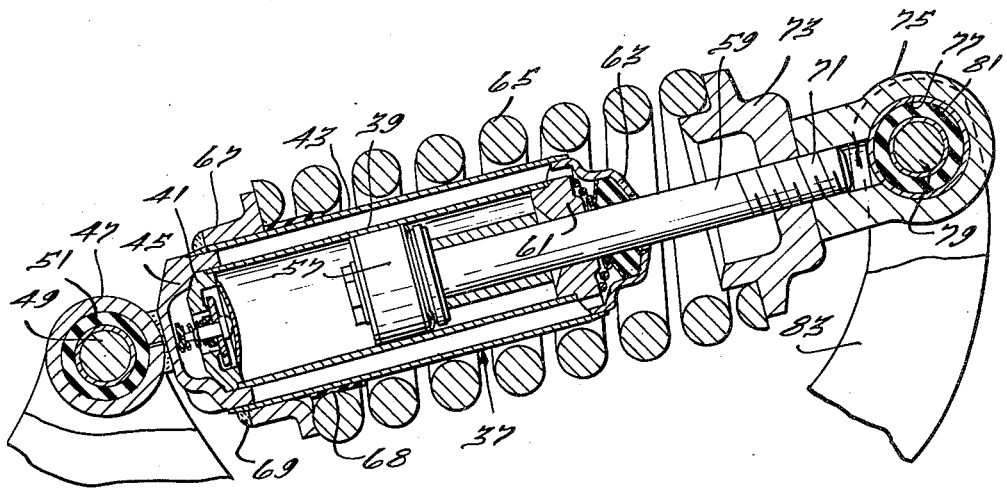
FIG. 2 is an enlarged, fragmentary, longitudinal sectional view of the draft control device illustrated in FIG. 1.

Referring now to the drawings, it will be seen that a portion of a vehicle, such as a farm tractor, is illustrated. The illustrated portion is a transmission housing 7 to which the vehicle rear axle 9 is connected in a conventional manner. An implement lift of any conventional three-point type is mounted on the tractor. In the illustrated embodiment, the implement lift includes an upper link 11 and a pair of transversely spaced lower links 13 and 15. The upper link 11 is pivotally mounted at 17 to the back face of the tractor transmission housing 7 and the free end 19 of the link 11 is adapted to be pivotally connected with an agricultural implement. The free or rear ends of the lower links 13 and 15 are provided with suitable fittings or means 21 for pivotally connecting the same to an agricultural implement. The forward ends of the links 13 and 15 are mounted, as will be hereinafter described in detail, on opposite ends of a transversely extending shaft 23 which is journaled on the tractor transmission housing 7. As can be best seen in FIG. 5, the opposite ends of the shaft 23 are journaled in bearings or bushings 25 which in turn are supported in suitable journal blocks 27 secured to the opposite sides of the transmission housing by bolts 29. An enlarged circular plate 31 is provided on opposite ends of shaft 23 outwardly of transmission housing 7. The shaft 23 is journaled so as to rotate about a generally horizontal axis 33.

A journal pin or hub 35 is rigidly connected with each of the shaft plates 31, radially outwardly of the axis 33, so that the longitudinal axes of the journal pins 35 are offset or disposed eccentrically with respect to the shaft axis 33. The forward ends of the implement lift lower links 13 and 15 are rotatably mounted on the journal pins 35 and held in position by cap screws 36. The links 13 and 15, therefore, may be raised or lowered either manually or by a hydraulic mechanism of any conventional type, not herein shown or described. However, it will be appreciated that if the lower links 13 and 15 are moved fore and aft, relative to the tractor, the shaft 23 will be rotated about its axis 33.

The draft control device of this invention is connected with shaft 23 so as to resiliently dampen and resist rotation thereof. In the illustrated embodiment, one draft control device is employed adjacent one end of shaft 23, as it is thought that this is adequate for most operations; but, if desired, a draft control device adjacent each end of the shaft 23 could be employed without departing from the scope of this invention. The draft control device illustrated includes a tubular direct-acting hydraulic shock absorber 37 of any conventional type such as, for example, disclosed in United States Reissue Patent No. 23,421. The illustrated shock absorber has a pressure cylinder 39, one end of which is closed by a base valve assembly 41 which controls the flow of fluid from the pressure cylinder to a reservoir provided between the pressure cylinder and an outer reserve tube 43. One end of the reserve tube 43 is closed by an end cap 45 on which is rigidly mounted a loop-type fitting 47. The loop-type fitting 47 is illustrated as being rotatably mounted on a journal pin or bolt 49 through a rubber bushing 51. The journal pin 49 is supported in a yoke-like bracket 53 which is rigidly mounted on the side of the transmission housing 7 by bolts 55. It will be noted, therefore, that one end of the shock absorber is pivotally mounted for movement about an axis fixed relative to the axis 33 of the shaft 23. A ported piston valve assembly 57 is disposed within the pressure cylinder 39 and has a piston rod 59 connected therewith and extending beyond the opposite end of the shock absorber. The piston rod extends through a rod guide 61 which closes one end of the pressure cylinder 39, and through an end cap and seal assembly 63 which closes the adjacent end of the reserve tube 43.

A coil spring 65 is sleeved over the shock absorber 37 and the front end of the coil spring abuts a collar-like support member 67 which in turn abuts a shoulder 69 rigid with or fixed to the shock absorber reserve tube 43. A rubber sleeve 68 may be disposed between the shock absorber and the coil spring to maintain the same in spaced relationship and to prevent metal-to-metal contact. The support member 67 and shoulder 69 thus constitute a rigid support for one end of the coil spring 65. The outer end of the piston rod 59 is threaded at 71 and threaded thereon is a second spring support member 73 which engages the rear end of the coil spring 65. The position of the second support member 73 on the piston rod may be varied by screwing the support member in and out on the piston rod threaded portion. In this way, preloading of the coil spring 65 may be varied so that the spring can be calibrated to properly accommodate various agricultural implements and conditions. A loop fitting 75 is threaded onto the outer end of the piston rod 59 and is rotatably supported on a bolt 79 through a metal-to-rubber type bushing assembly 81. Bolt 81 is supported in the upper or trailing end of a reaction arm 83, the opposite end of which is bolted to its adjacent shaft end plate 31 by cap screws 85. It will be noted that the reaction arm 83 is connected to the shaft end plate 31 radially outwardly of the shaft axis 33 so that rotation of the shaft will cause fore and aft movement of the reaction arm 83 which in turn will cause movement of the shock absorber piston rod 59 and its associated ported piston valve assembly 57, as well as compression of the spring 65 when the reaction arm moves forwardly. If an implement, such as a plow, strikes an obstruction in the ground or a "hard pan," the implement will suddenly and sharply pivot so that a sharp forward thrust on upper lift link 11 will occur and a rearward thrust on lower links 13 and 15 will occur. Rearward movement of links 13 and 15 will cause rotation of shaft 23 and forward movement of reaction arm 83. Spring 65 will thus be compressed and will resiliently resist and dampen such movement. Thereafter, spring 65 will expand to resiliently return the implement to its original position and draft angle. Shock absorber 37 dampens spring 65 and eliminates spring surge and recovery shock, as well as providing to some degree compression resistance.

It will thus be seen that an improved and novel draft control device is associated with the tractor and implement lift to perform the aforementioned results. Likewise, it will be appreciated that this draft control device is relatively inexpensive to manufacture, efficient in operation and durable in construction.

What is claimed is:

1. In combination, a vehicle, an implement lift connected with said vehicle and a draft control device connected with said vehicle and with said lift, said lift including an upper link pivotally connected with said vehicle and adapted to be connected with an implement and a pair of lower links adapted to be connected with an implement, a transverse shaft journaled on said vehicle for rotation about a generally horizontal axis, means connecting said lower links with the opposite ends of said shaft for rotation about an axis spaced radially outwardly of said shaft axis of rotation so that fore and aft movement of said lower links will cause rotation of said shaft, an arm having one end rigidly connected with one end of said shaft radially outwardly of the axis of rotation of said shaft so that the opposite end of said arm will move fore and aft upon rotation of said shaft, said draft control device including a direct-acting tubular shock absorber having an elongated tubular pressure cylinder and a bore fitting piston slidably disposed in said pressure cylinder and adapted to control flow of hydraulic fluid therepast to opposite sides thereof for dampening the movement of said lift toward and away from said vehicle, a piston rod connected to said piston and projecting beyond one end of said pressure cylinder, means pivotally connecting one end of said tubular pressure cylinder to said vehicle, means pivotally connecting one end of said piston rod to said opposite end of said arm, first collar means mounted adjacent the pivoted end of said pressure cylinder, second collar means mounted adjacent the pivoted end of said piston rod, and a coil spring surrounding said shock absorber and having its opposite ends engaging said first and second collar means for resiliently resisting movement of said lift toward said vehicle, and said coil spring and said direct-acting tubular shock absorber coacting to resiliently return said lift to a predetermined position following movement thereof toward said vehicle while eliminating spring surge and recovery shock.

2. In combination, a vehicle, an implement lift connected with said vehicle and a draft control device connected with said vehicle and with said lift, said lift including an upper link pivotally connected with said vehicle and adapted to be connected with an implement and a pair of lower links adapted to be connected with an implement, a transverse shaft journaled on said vehicle for rotation about a generally horizontal axis, means connecting said lower links with the opposite ends of said shaft for rotation about an axis spaced radially outwardly of said shaft axis of rotation so that fore and aft movement of said lower links will cause rotation of said shaft, an arm having one end rigidly connected with one end of said shaft radially outwardly of the axis of rotation of said shaft so that the opposite end of said arm will move fore and aft upon rotation of said shaft, said draft control device including a direct-acting tubular shock absorber having an elongated tubular pressure cylinder and a bore fitting piston slidably disposed in said pressure cylinder and adapted to control flow of hydraulic fluid therepast to opposite sides thereof for dampening movement of said lift toward and away from said vehicle, a piston rod connected to said piston and projecting beyond one end of said pressure cylinder, means pivotally connecting one end of said tubular pressure cylinder to said vehicle, means pivotally connecting one end of said piston rod to said opposite end of said arm, first collar means mounted adjacent the pivoted end of said pressure cylinder, second collar means mounted adjacent the pivoted end of said piston rod, and a coil spring surrounding said shock absorber and having its opposite ends engaging said first and said second collar means for resiliently resisting movement of said lift toward said vehicle, at least one of said collar means being adjustably connected relative to said shock absorber so that preloading of said spring can be adjusted, and said spring and said direct-acting tubular shock absorber coacting to resiliently return said implement lift to a predetermined position while eliminating spring surge and recovery shock.

3. A draft control device comprising a member rotatable about a predetermined axis, an actuator member connected with said rotatable member radially outwardly of said axis so that fore and aft movement of said actuator member will cause rotation of said rotatable member, a rigid reaction member connected adjacent one end thereof to said rotatable member radially outwardly of said rotatable member axis so that rotation of said rotatable member will cause fore and aft movement of the opposite end of said reaction member, a direct-acting hydraulic shock absorber including relatively movable telescopic parts which dampen fore and aft movement of said actuator member, one of said parts being supported for pivotal movement about an axis fixed relative to the axis of said rotatable member, the other of said shock absorber parts being pivotally connected to said opposite end of said reaction member, collar means on said telescopic shock absorber parts adjacent each end of said shock absorber, a coil spring surrounding said shock absorber having its opposite ends engaging said collar means for resiliently resisting fore movement of said opposite end of said reaction member, and said spring and said direct-acting tubular shock absorber coacting to resiliently return said actuator member to a predetermined position while eliminating spring surge and recovery shock.

4. A draft control device comprising a member rotatable about a predetermined axis, a reaction arm having one end thereof connected with said rotatable member in an eccentric relationship relative to the axis of rotation of the said rotatable member so that rotation of said rotatable member will cause fore and aft movement of said reaction arm, a direct-acting hydraulic shock absorber including relatively movable telescopic portions, means on one of said shock absorber portions which dampen fore and aft movement of said reaction arm for pivotally connecting the same to a fixed support, the other of said shock absorber portions including a piston rod having the free end thereof externally threaded, a support member mounted on said one of said shock absorber parts adjacent the pivotal connection means, a second support member adjustably threadably connected with said threaded piston rod, a coil spring sleeved over the exterior of said shock absorber and having its opposite ends engaging said first and second support members whereby the preloading of said coil spring can be adjustably controlled for resiliently resisting fore movement of said reaction arm, and means connected with said piston rod and pivotally connecting said piston rod with said opposite end of said reaction arm, and said spring and said direct-acting tubular shock absorber coacting to resiliently return said reaction arm to a predetermined position while eliminating spring surge and recovery shock.

References Cited in the file of this patent

UNITED STATES PATENTS

| | | |
|---|---|---|
| Re. 23,421 | Whisler | Oct. 16, 1951 |
| 2,561,901 | Bachman et al. | July 24, 1951 |
| 2,664,804 | O'Harrow | Jan. 5, 1954 |
| 2,702,501 | Simpson | Feb. 22, 1955 |
| 2,730,029 | Brundage | Jan. 10, 1956 |
| 2,754,742 | Altgelt | July 17, 1956 |
| 2,756,045 | Savory | July 24, 1956 |
| 2,890,474 | Ferguson | June 16, 1959 |
| 2,902,274 | McIntyre | Sept. 1, 1959 |

FOREIGN PATENTS

| | | |
|---|---|---|
| 740,112 | France | Nov. 12, 1932 |